United States Patent
Gilmour et al.

[11] Patent Number: 6,122,028
[45] Date of Patent: Sep. 19, 2000

[54] REFLECTIVE LIQUID CRYSTAL DEVICE WITH POLARIZING BEAM SPLITTER

[75] Inventors: Sandra Gilmour, Stow on the Wolt; Martin David Tillin, Abingdon; Michael John Towler, Botley, all of United Kingdom

[73] Assignee: Sharp Kabushiki Kaisha, Osaka, Japan

[21] Appl. No.: 09/169,769

[22] Filed: Oct. 9, 1998

[30] Foreign Application Priority Data

Oct. 17, 1997 [GB] United Kingdom ............. 9721906

[51] Int. Cl.⁷ ................................. G02F 1/1335
[52] U.S. Cl. .................. 349/117; 349/113; 349/119; 349/100; 349/18; 349/5
[58] Field of Search ...................... 349/113, 117, 349/119, 98, 100, 18, 5

[56] References Cited

U.S. PATENT DOCUMENTS

| | | | |
|---|---|---|---|
| 3,912,369 | 10/1975 | Kashnow ................ | 350/160 |
| 4,025,164 | 5/1977 | Doriguzzi et al. ........ | 350/160 |
| 5,231,521 | 7/1993 | Johnson et al. .......... | 359/93 |
| 5,243,455 | 9/1993 | Johnson et al. .......... | 359/93 |
| 5,381,253 | 1/1995 | Sharp et al. ............. | 359/53 |
| 5,392,142 | 2/1995 | Mitsutake et al. ........ | 359/53 |
| 5,469,279 | 11/1995 | Sharp et al. ............. | 359/53 |
| 5,568,283 | 10/1996 | Mitsutake et al. ........ | 359/53 |
| 5,658,490 | 8/1997 | Sharp et al. ............ | 252/299.01 |
| 5,798,809 | 8/1998 | Nakamura et al. ........ | 349/119 |
| 5,847,790 | 12/1998 | Anderson et al. ........ | 349/100 |

FOREIGN PATENT DOCUMENTS

| | | |
|---|---|---|
| 0389240 | 2/1990 | European Pat. Off. . |
| 0586155 | 3/1994 | European Pat. Off. . |
| 0 616 240 A1 | 9/1994 | European Pat. Off. . |
| 0803758 | 10/1997 | European Pat. Off. . |
| 0840160 | 10/1997 | European Pat. Off. . |
| 9515513 | 6/1995 | WIPO . |
| 9631577 | 10/1996 | WIPO . |

OTHER PUBLICATIONS

Article "Late–News paper:Improvement in Light Efficienty of a–Si:H TFT Address Reflective λ/4HAN–Mode Light Valves for Color TV Projection "; by J. Glueck SID 93 Digest; pp. 299–302; Published Mat 16, 1993.

Article from Journal of Applied Physics, Nov. 15, 1989; "Device Physica of the Soft–Mode Electro–Optics Efrfect " pp. 4983–4995; by G. Anderson.

"Reflective Single Polariser Low and High Twist Liquid–Crystal Displays "; SID International Symposium Digest of Technical Papers; vol. 29, 1998, pp. 311–314.

*Primary Examiner*—James A. Dudek
*Assistant Examiner*—Tarifur R. Chowdhury
*Attorney, Agent, or Firm*—Renner, Otto Boisselle & Sklar

[57] ABSTRACT

A reflective liquid crystal device includes a polarising beam splitter, a polarisation preserving reflector and a retarder arrangement including at least two retarders. A first of the retarders is disposed between the beam splitter and the reflector, and a second of the retarders is disposed between the first retarder and the reflector, and at least one of the first and second retarder including a liquid crystal layer which is switchable between a dark device state and a bright device state. In the dark state, the retarder arrangement rotates the plane of polarisation of plane-polarised light directed by the beam splitter towards the reflector by substantially n×180°, where n is an integer, and in a bright device state the first retarder has a retardation of substantially λ/2 and the second retarder has a retardation of substantially λ/4.

16 Claims, 8 Drawing Sheets

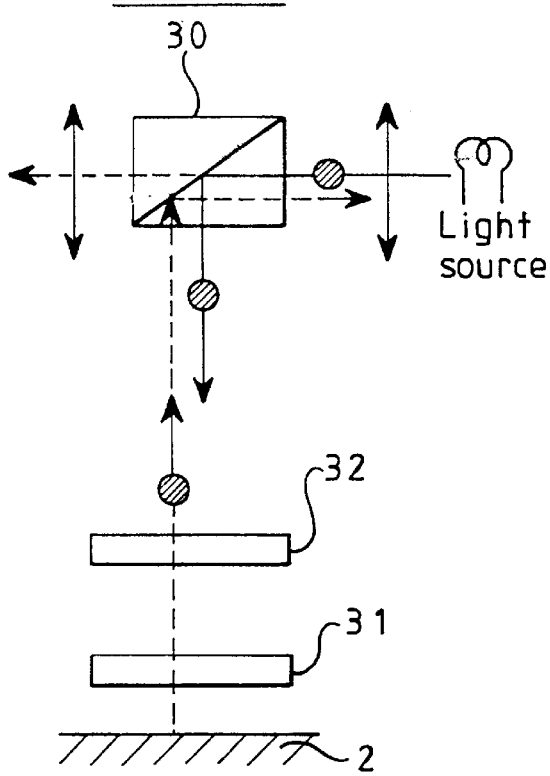
FIG 1(a)
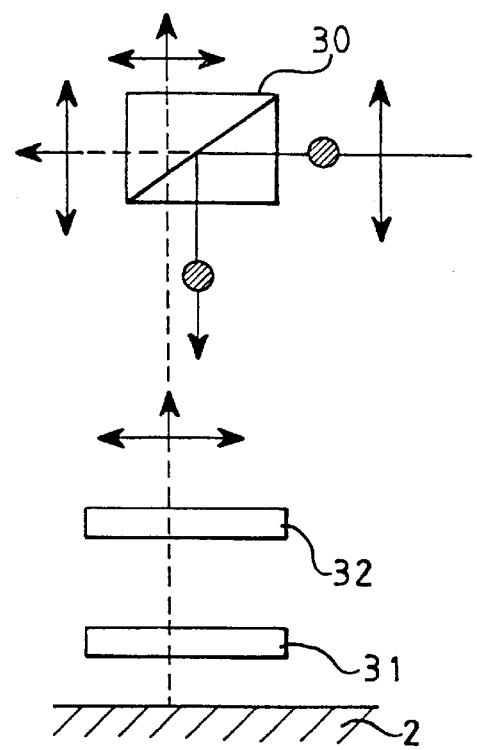
FIG 1(b)
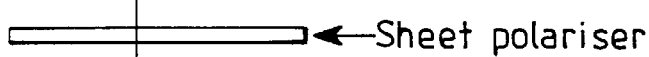
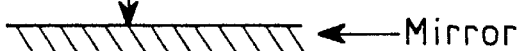
FIG 2(a)
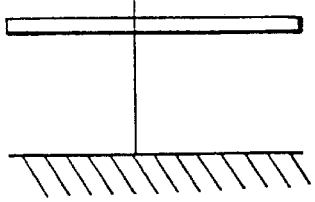
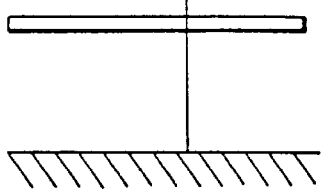

REFLECTIVE LIQUID CRYSTAL DEVICE WITH POLARIZING BEAM SPLITTER

TECHNICAL FIELD OF THE INVENTION

The present invention relates to a reflective liquid crystal device utilising a polarising beam splitter. Such devices may be used, for instance, in liquid crystal projection displays.

BACKGROUND OF THE INVENTION

Proc. Ind. Acad. Sci., 1955, 41A 130 and 137 disclose circular polarisers and quarter waveplates made of combinations of birefringent plates to provide improved achromaticity. The individual retarders are combined with different azimuthal orientations of their optic axes to achieve the improvement in achromatic performance.

Seki et al, Mol. Cryst. Liq. Cryst., 1995, 263, 499 and Seki et al, Eurodisplay, 1996, 464 disclose a liquid crystal device (LCD) of the reflective electrically controlled birefringence (ECB) type comprising a nematic liquid crystal and a quarter waveplate. The optic axis of the quarter waveplate is crossed with that of the nematic liquid crystal and is at 45° to a polariser disposed on one side of the nematic liquid crystal. The untwisted liquid crystal and quarter waveplate are disposed between the polariser and a mirror and a normally white state is achieved with the liquid crystal providing a retardation of $\lambda/4$. A black state is achieved by controlling the liquid crystal so as to provide zero retardation. This black state is effectively provided by the quarter waveplate and is achromatic only to the degree that the quarter waveplate is achromatic. A further retarder of negative birefringence with its optic axis perpendicular to its plane may be included to improve viewing angle performance.

Uchida et al, Asia Display, 1995, 599 discloses a reflective display in which a polariser and a mirror are disposed on opposite sides of a Hybrid Aligned Nematic Liquid Crystal Layer and a Retarder. The retarder is biaxial having an optic axis out of the plane to improve viewing angle and an in-plane optic axis which co-operates with the retardation of the liquid crystal layer to provide black and white states. The retarder in-plane axis is at 45° to the polarising axis of the polariser and is crossed with the optic axis of the liquid crystal layer. A normally black state is provided when the net retardation of the liquid crystal layer and the retarder is equal to $\lambda/4$. A white state is provided when the retardation of the liquid crystal is such that it cancels the retardation of the retarder. Such a display depends for its achromaticity on optimising the dispersion of the optical elements.

Ishinabe et al, Eurodisplay, 1996, 199 discloses a full colour reflective LCD in which a HAN liquid crystal layer and a biaxial retarder are disposed between a linear polariser and a mirror. The optic axis of the HAN layer is crossed with the optic axis of the retarder and is at 45° to the polarising axis of the polariser. A normally black state is achieved by making the difference between retardations of the liquid crystal layer and the retarder equal to $\lambda/4$. Achomaticity is improved by adjusting the dispersion of materials of the liquid crystal layer and the retarder so that the birefringences partially compensate each other.

Kuo et al, Asia Display, 1995, 135 also discloses an LCD in which a HAN liquid crystal layer and a biaxial retarder are disposed between a linear polariser and a mirror. A dark state is provided when the total retardation is equal to an odd number of quarter wavelengths. The retarder has an in-plane optic axis which is crossed with the liquid crystal axis and is at 45° to the polariser axis. The display may be operated in the normally black mode, as described hereinbefore, or in the normally white mode, in which case a larger passive retarder is used. Achromaticity may be improved by optimising the dispersion of the elements or by adjusting the dispersion so that the birefringences compensate each other.

Wu et al, Applied Physics Letters, 1996, 68, 1455 discloses a reflective LCD in which a twisted nematic liquid crystal cell and a retarder are disposed between a polariser and a mirror. The twisted nematic liquid crystal cell has a twist angle of 90°, is relatively thin, and has its input director angled at 20° to the axis of the polariser. The retarder provides a retardation of $\lambda/4$ and has an optic axis angled at 45° to the polariser axis. The cell operates in the normally white mode where the retardations of the liquid crystal cell and the retarder cancel each other in the white state and the black state is obtained by reducing the retardation of the liquid crystal cell to zero. Accordingly, the achromaticity depends on the achromaticity of the retarder.

Kuo et al, Eurodisplay, 1996, 387 discloses a similar twisted nematic display which is operated in the normally white mode and again achieves a black state whose achromaticity depends on the achromaticity of the retarder.

Fukuda et al disclose in three papers (IDRC, 1994, 201; SID Journal, 1995, 3, 83; Asia Display 1995, 881) a reflective supertwisted nematic (STN) LCD comprising a single polariser and a single retardation film. The twist of the liquid crystal is between 220 and 260° and the device operates in the normally white mode. STN liquid crystal is used to allow high multiplex ratios i.e: small voltage differences between on and off voltages and hence a large value of $d\Delta n$ of the liquid crystal, for instance greater than 0.6 micrometers. Achromaticity is improved by varying the dispersive properties of the liquid crystal and the retarder.

EP-A-0 389 240, on which the preamble of claim 1 is based, discloses a projection system that uses a polarising beam splitter. Light incident on the polarising beam splitter is directed towards a reflective liquid crystal device. A $\lambda/4$ retarder is disposed between the polarising beam splitter and the reflective liquid crystal device.

EP-A-0 389 240 also discloses a full colour projection system, in which white light is split into red, green and blue components. Three polarising beam splitters are provided, one each for receiving red, green and blue light. Light incident on each of the polarising beam splitters is directed to a respective reflective liquid crystal device via a $\lambda/4$ retarder.

SUMMARY OF THE INVENTION

A first aspect of the present invention provides a reflective liquid crystal device comprising: a polarising beam splitter, a polarisation preserving reflector, and a retarder arrangement comprising at least two retarders, a first of which is disposed between the beam splitter and the reflector, and a second of which is disposed between the first retarder and the reflector, at least one of the first and second retarders comprising a liquid crystal layer which is switchable between a dark device state, in which the retarder arrangement rotates the plane of polarisation of plane-polarised light directed by the beam splitter towards the reflector by substantially n×180°, where n is an integer, and a bright device state; characterised in that in the bright device state the first retarder has a retardation of substantially $\lambda/2$ and the second retarder has a retardation of substantially $\lambda/4$.

Disposing the substantially $\lambda/4$ retarder between the substantially $\lambda/2$ retarder and the reflector provides improved performance compared with the devices of EP-A-0 389 240.

By placing the substantially λ/4 retarder between the substantially λ/2 retarder and the reflector, two advantages over EP-A-0 389 240 are obtained.

Firstly, the bright state of the devices of this invention is less wavelength-dependent than the devices of EP-A-0 389 240. This leads to a more efficient device.

Secondly, in the case in which the substantially λ/2 retarder comprises an in-plane switching liquid crystal material (such as an antiferroelectric liquid crystal or a similar liquid crystal), in this invention the liquid crystal material has to switch only by ±22.5° to obtain the bright state. In contrast, if such an in-plane switching liquid crystal material were used for the substantially λ/2 retarder, with a substantially λ/4 retarder disposed between the substantially λ/2 retarder and the polarising beam splitter as in EP-A-0 389 240, then the in-plane switching liquid crystal would have to switch by ±45° to obtain the maximum bright state. Many known in-plane switching smectic liquid crystal materials (for example, antiferroelectric liquid crystals or similar liquid crystal materials) exist which can switch to ±22.5°, but there are few known materials which can switch to ±45°. In the present invention, therefore, it is straightforward to find a liquid crystal material that will switch sufficiently to obtain the maximum bright state, and this again leads to a device that is more efficient device than those disclosed in EP-A-0 389 240.

The retarder arrangement may rotate the plane of polarisation of plane-polarised light directed by the beam splitter towards the reflector by substantially 90° in the bright device state.

In the bright device state the first retarder may have its optic axis at an angle α to the plane of polarisation of the plane polarised light directed by the beam splitter towards the reflector, and the second retarder may have its optic axis at an angle 2α+45° to the plane of polarisation of the plane polarised light directed by the beam splitter towards the reflector.

The angle α may be substantially equal to 22.5°.

Alternatively, the first and second retarders may each comprise a liquid crystal layer, and α may be substantially equal to 15°.

The first retarder may comprise the liquid crystal layer whose optic axis rotates by an angle substantially equal to 22.5° about the normal direction of light passage during switching.

The first retarder may comprises the liquid crystal layer and have a retardation which is switchable between substantially pλ/2 and substantially (p+1)λ/2, where p is an integer.

The integer p may be equal to zero or one.

The liquid crystal layer may be an out-of-plane switching nematic liquid crystal.

The liquid crystal layer may be a ferroelectric liquid crystal.

The liquid crystal layer may alternatively be an antiferroelectric liquid crystal.

The liquid crystal layer may alternatively be an electroclinic liquid crystal.

The liquid crystal layer may alternatively be an in-plane switching nematic liquid crystal.

The device may further comprise a second polarisation preserving reflector, and another retarder arrangement comprising a third retarder disposed between the beam splitter and the second reflector and a fourth retarder disposed between the third retarder and the reflector, at least one of the third and fourth retarders comprising another liquid crystal layer which is switchable between a dark device state, in which the another retarder arrangement rotates the plane of polarisation of plane-polarised light directed by the beam splitter towards the another reflector by substantially n×180°, where n is an integer, and a bright device state.

A second aspect of the invention provides a reflective liquid crystal device comprising: a polarising beam splitter for directing light towards a wavelength separator; first and second polarisation preserving reflectors, the wavelength separator directing light of a first wavelength towards the first reflector and directing light of a second wavelength different from the first wavelength towards the second reflector; a first retarder arrangement disposed in the optical path between the beam splitter and the first reflector; and a second retarder arrangement disposed in the optical path between the beam splitter and the second reflector;

wherein the first retarder arrangement is switchable between a dark state, in which the first retarder arrangement rotates the plane of polarisation of plane-polarised light of the first wavelength directed by the beam splitter towards the first reflector via the wavelength separator by substantially n×180°, where n is an integer and a bright state;

and wherein the second retarder arrangement is switchable between a dark state, in which the second retarder arrangement rotates the plane of polarisation of plane-polarised light of the second wavelength directed by the beam splitter towards the second reflector via the wavelength separator by substantially n×180°, where n is an integer and a bright state;

characterised in that the first retarder arrangement comprises, in the bright state, a first retarder having a retardation of substantially λ/2 disposed between the beam splitter and the first reflector and a second retarder having a retardation of substantially λ/4 disposed between the first retarder and the first reflector;

and in that the second retarder arrangement comprises, in the bright state, a third retarder having a retardation of substantially λ/2 disposed between the beam splitter and the second reflector and a fourth retarder having a retardation of substantially λ/4 disposed between the third retarder and the second reflector.

The first retarder may comprise a first liquid crystal layer; and the third retarder may comprise a second liquid crystal layer.

The first liquid crystal layer may be the second liquid crystal layer.

It is thus possible to provide an LCD which is suitable for use in reflective displays. High brightness and contrast are achieved in a reflective single polariser device which has a wide acceptance angle and a fast response speed. It is further possible to achieve a bright state having a degree of achromaticity which is substantially improved compared with known displays of the single polariser and reflector type. The optic axes of the retarders are oriented such that the combinations gives a retardation of λ/4 for the input polarised light from the polariser over a wide range of wavelengths in the bright state. The bright state is therefore very bright and achromatic and this in turn gives high contrast when combined with the dark state. The retarders need not be made of the same material and the dispersive properties of the retarder materials are not substantially important for achieving achromaticity, although the best display is obtained by using identical materials of as low dispersion as possible.

Thus, a high brightness device is provided because of the use of a single polarising beam splitter. Good achromatic behaviour permits high contrast to be achieved. The use of optically thin layers permits a wide acceptance angle.

The present invention will be further described, by way of example, with reference to the accompanying drawings, in which:

BRIEF DESCRIPTION OF THE DRAWINGS

FIG. 1(a) is a diagrammatic view of a display constituting a first embodiment of the invention in its DARK state;

FIG. 1(b) is a diagrammatic view of a display constituting the first embodiment of the invention in its BRIGHT state;

FIG. 2(a) is a schematic view illustrating optical paths for a comparative display device as described in co-pending UK patent application No 9622733.5;

FIGS. 1(a), 1(b) and 2(b) are schematic views illustrating an embodiment of this invention. This has some similarities to the devices described in co-pending UK patent application No: 9622733.5, but it uses a polarising beam splitter in place of a linear polariser.

DETAILED DESCRIPTION OF THE INVENTION

The symbols TM and TE denote two orthogonal states of plane polarised light. In the TM state the light is polarised with the electric field vector in the plane of the paper, and in the TE state the light is polarised with the electric field vector perpendicular to the plane of the paper. The polarising beam splitter 30 is illuminated with light which contains both TM and TE components. The TE component is directed by the beam splitter 30 towards a polarisation preserving reflector 2, whereas the TM component passes through the beam splitter 30, and is lost in this embodiment.

Optical components 31, 32 are provided in the optical path between the beam splitter 30 and the reflector 2. If these are chosen such that the light reflected back towards the beam splitter 30 is still in the TE polarised state, the light will be directed back along the path of the incident light (FIG. 1(a)). If, however, the optical components in the optical path between the beam splitter 30 and the reflector 2 are such that the reflected light incident on the beam splitter 30 is now in the TM polarisation state, the reflected light will not be directed back towards the light source but will pass through the beam splitter 30 (FIG. 1(b)).

Figure 2B:
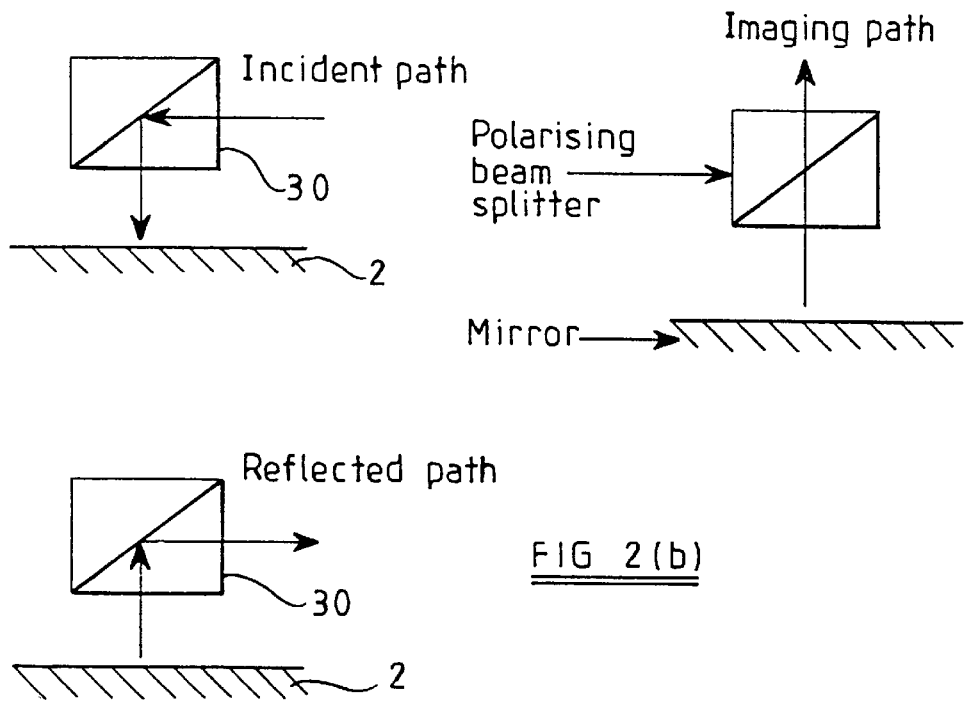
FIG. 2(b) is a schematic view illustrating the optical paths for a display device according to the invention.

In a direct view reflective display such as those described in UK 9622733.5, it is usual to consider only paths of INCIDENT light and REFLECTED light. In order to describe embodiments of this invention, however, it is necessary also to consider the path of IMAGING light. In a direct view reflective display the INCIDENT, IMAGING and REFLECTED paths are collinear (FIG. 2(a)). This is not the case for a device based on a polarising beam splitter, however—only the INCIDENT and REFLECTED paths are collinear (FIG. 2(b)). Moreover if the REFLECTED path is bright then the IMAGING path is dark, and vice-versa.

In the embodiment shown in FIGS. 1(a) and 1(b), the component denoted by 31 is a $\lambda/4$ retarder with its optic axis at $45+2\alpha°$ to the plane of polarisation of the light directed towards the reflector 2 by the beam splitter 30 (that is, at $45+2\alpha°$ to the plane of polarisation of the TE component).

Reference numeral 32 denotes a nematic liquid crystal cell. In the BRIGHT state, shown in FIG. 1(b), the liquid crystal cell is a $\lambda/2$ retarder with its optic axis at $\alpha°$ to the plane of polarisation of the TE light.

Figure 3:
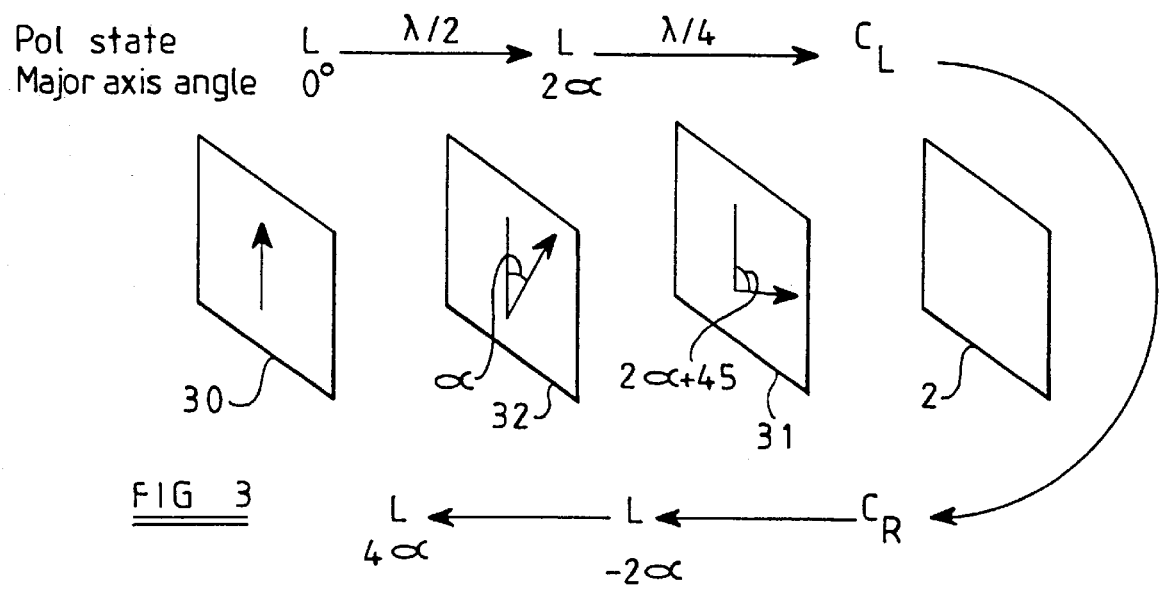
FIG. 3 illustrates the polarisation states for the operation of a display according to the first embodiment of the invention in a BRIGHT state.

The operation of the device in this state is shown in FIG. 3. Linear polarisations are indicated by "L", left handed circular polarisation is indicated by "$C_L$" and right handed circular polarisation is indicated by "$C_R$".

The beam splitter 30 is represented in FIG. 3 as a linear polariser, for convenience. Unpolarised light is incident on the beam splitter 30 from a light source (not shown in FIG. 3), and the beam splitter 30 directs plane polarised TE light towards the liquid crystal cell 32. In the BRIGHT state the liquid crystal cell 32 is a $\lambda/2$ retarder, and it will rotate the plane of polarisation of the TE light by $2\alpha°$.

When the light is incident on the $\lambda/4$ plate 31 its plane of polarisation is at 45° to the optic axis of the $\lambda/4$ plate 31. The light is thus converted to circularly polarised light by the $\lambda/4$ plate 31.

Upon reflection by the reflector 2, the light is converted to circularly polarised light of the opposite hand. The $\lambda/4$ plate 31 will therefore convert it to plane polarised light with the plane of polarisation at $-2\alpha°$ to the plane of polarisation of the TE light, and this will be rotated to $4\alpha°$ by the liquid crystal cell 32. Light returned to the beam splitter 30 can therefore be regarded as a combination of the TE and TM polarisation states, and the TM component will pass through the beam splitter 30 along the imaging path.

To obtain the DARK state of the device, the liquid crystal cell is switched to provide zero retardation, so that the polarisation of the TE light is not changed by either retarder 31, 32 if $\alpha=22.5°$. The light returns to the beam splitter 30 still in the TE state, and is directed along the REFLECTED path.

A high voltage is usually required to put a planar aligned nematic liquid crystal into a state in which it provides zero retardation. In an alternative embodiment of the invention shown in FIG. 4, therefore, an additional retarder 33 is provided in the optical path between the beam splitter 30 and the reflector 2. This additional retarder 33 has its optic axis crossed with the rubbing direction of the nematic liquid crystal. The combination of the additional retarder 33 and the liquid crystal panel 32 provide zero retardation at a lower applied voltage across the liquid crystal panel 32. Although the additional retarder 33 is shown between the liquid crystal panel 32 and the $\lambda/4$ plate 31 in FIG. 4, it is possible to interchange the positions of the additional retarder 33 and the liquid crystal panel 32.

An alternative to providing the additional retarder 33 is to use a biaxial $\lambda/4$ retarder for the $\lambda/4$ retarder 31.

Alternatively, a negative Δε homeotropically aligned nematic liquid crystal panel can be used.

Preferably, α is 22.5° if the component 31 is a fixed retarder and the component 32 is a switchable liquid crystal cell. If components 31 and 32 are both switchable liquid crystal cells, then preferably α=15° in the BRIGHT state. The light returned to the beam splitter 30 contains only the TM component in this case, so all light returned to the beam splitter 30 will pass along the IMAGING path (ignoring absorption losses in the beam splitter 30).

In an alternative embodiment of the invention, the liquid crystal panel 32 is a λ/2 retarder with an optic axis whose direction can be switched between 0° to the plane of polarisation of the incoming TE light and ±22.5° to the plane of polarisation of the TE light.

In the BRIGHT state of the device, the optic axis of the liquid crystal panel 32 is switched to ±22.5° to the plane of polarisation of the TE light. The liquid crystal panel 32 and the λ/4 retarder 31 combine to rotate the plane of polarisation of the incident light by 90°, as described above for the embodiment of FIGS. 1(a) and 1(b), so the light returned to the beam splitter 30 passes through the beam splitter 30 along the imaging path.

To obtain the DARK state of the device, the optic axis of the liquid crystal panel 32 is switched to 0° to the plane of polarisation of the TE light. The polarisation of the light is unaffected by either the liquid crystal panel 32 or the λ/4 retarder 31, and the light returns to the beam splitter 30 in the TE polarisation state and is directed along the REFLECTED path.

In this embodiment, the liquid crystal panel 32 can contain a ferroelectric liquid crystal (FLC), a distorted helix ferroelectric liquid crystal (DHF), a short-pitch bistable ferroelectric liquid crystal (SBF), an antiferroelectric liquid crystal (AFLC), or an in-plane switching nematic liquid crystal (IPSN). The preferred liquid crystal is a antiferroelectric liquid crystal (SBF or DHF). Using this, the liquid crystal panel would have its optic axis at 0° to the plane of polarisation of the TE light when no voltage is applied to the liquid crystal panel, and applying a voltage would switch the optic axis to ±22.5°. Thus, the device would be a "normally black" device (that is, in the DARK state when no voltage is applied).

Figure 4:
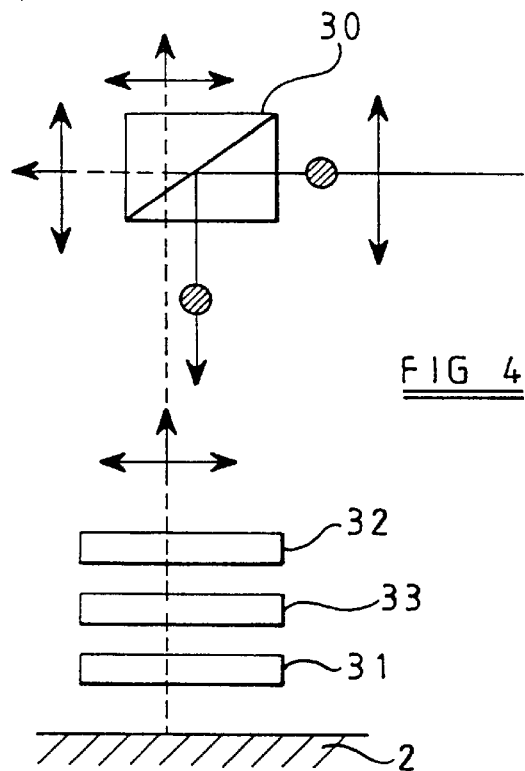
FIG. 4 is a diagrammatic view of a display constituting a second embodiment of the invention.
Figure 5:
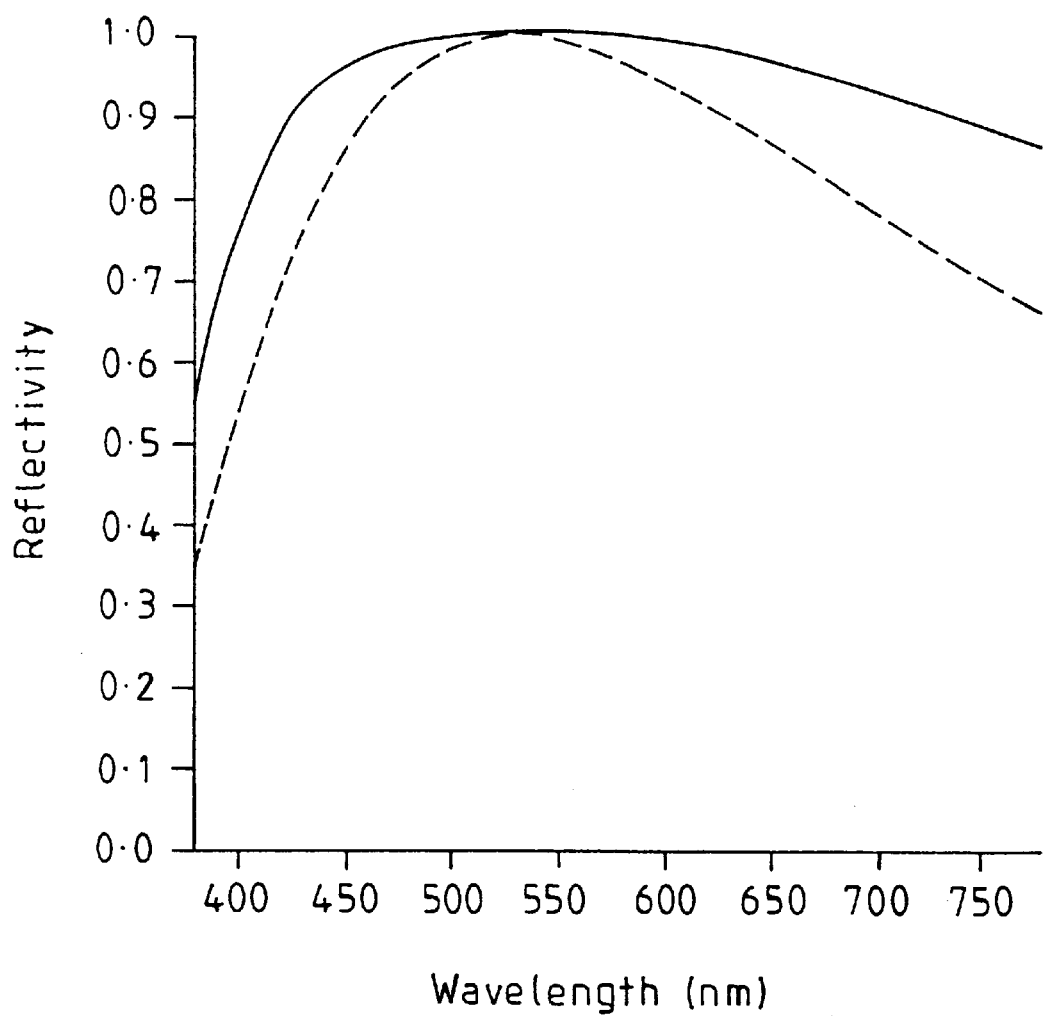
FIG. 5 shows a theoretical calculation of the reflectivity, in the BRIGHT state, of a display device according to the first or second embodiment of the invention.

FIG. 5 is a theoretical calculation (assuming perfect polarisation) of the reflectivity in the BRIGHT state as a function of wavelength for the devices of FIGS. 1(a), 1(b) or 4 as a full line. The broken line shows the transmissivity obtained using a single birefringent element of λ/4 retardation having its optic axis at 45° to the polariser direction (ZL1-2293 material). The reflectivity of the devices of the present invention is more achromatic and, as a result, the device has a higher overall brightness. Values for the CIE x/y co-ordinates and luminance are shown below.

|  | x | y | L |
|---|---|---|---|
| Single LC panel, λ/4 | 0.3144 | 0.3474 | 96.8% |
| This invention | 0.3137 | 0.3346 | 99.3% |
| White point, D65 | 0.3127 | 0.3290 | 100% |

A full colour display can be obtained by providing colour filters in the liquid crystal panel, or by using a time-multiplex method.

Figure 6:
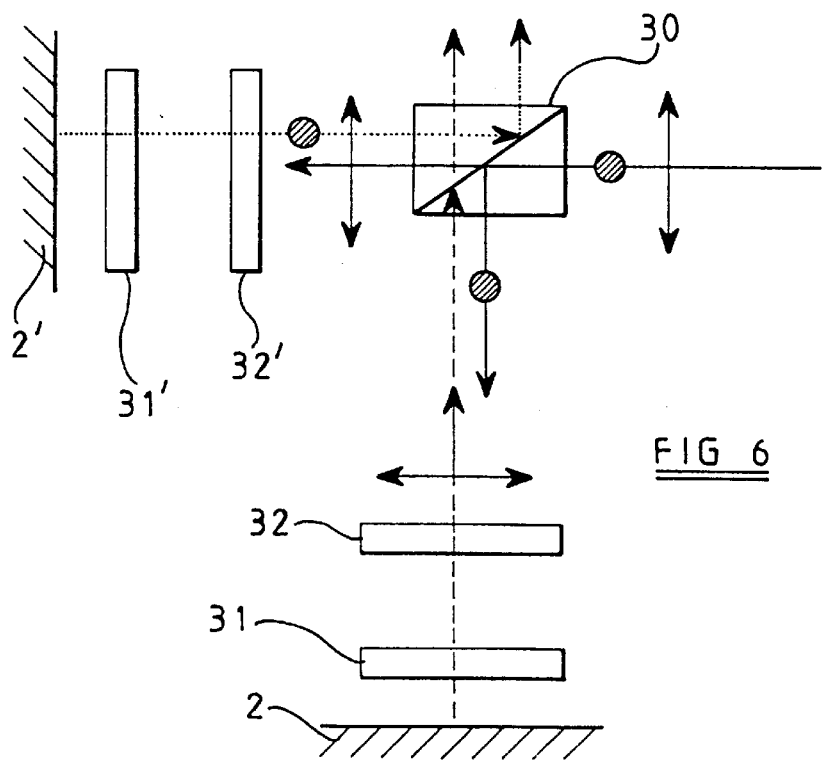
FIG. 6 is a diagrammatic view of a display according to a third embodiment of the invention.

FIG. 6 shows a two panel system, in which a second liquid crystal panel 32', a second λ/4 retarder 31' and a second reflector 2' are provided in the path of the TM polarised component of light incident on the beam splitter. If the second liquid crystal panel 32' and the second λ/4 retarder 31' combine to change the polarisation of the light returned to the beam splitter by the second reflector from TM to TE, then the light returned to the beam splitter by the second reflector is directed along the IMAGING path by the beam splitter as shown in FIG. 6.

If different information is shown on the two liquid crystal panels, the system can be used to provide a 3-D projection system. Alternatively, the system can be arranged to divide the grey level load between the two panels. If the two panels display the same information, then the brightness of the display is increased.

Figure 7:
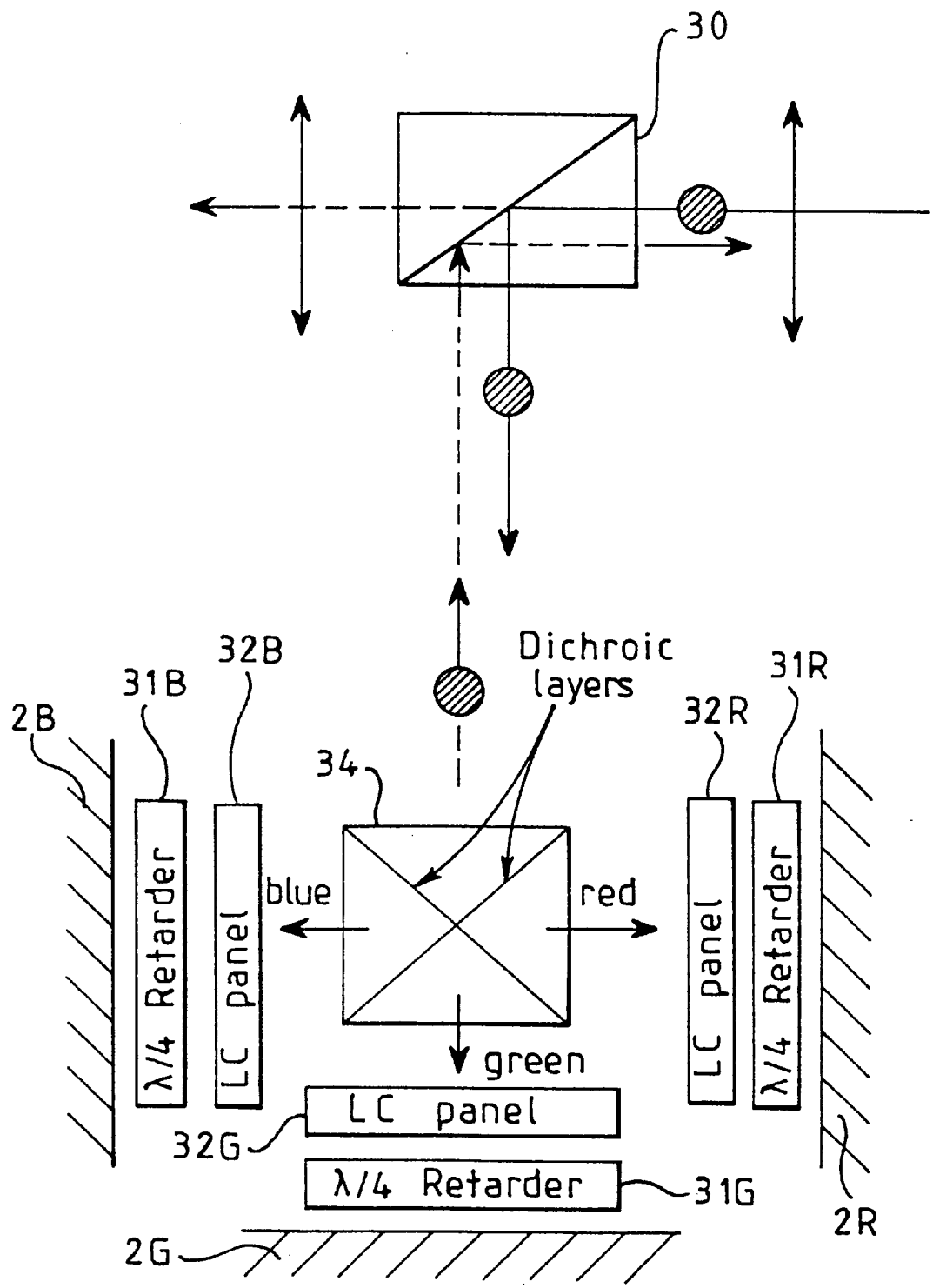
FIG. 7 is a diagrammatic view of a display according to a fourth embodiment of the invention.

FIG. 7 shows a three panel system, in which the beam splitter directs the TE polarised component of the incoming light towards a wavelength separator 34, such as a dichroic prism, which directs red, green and blue light in three mutually different directions. Three reflectors 2B, 2G, 2R are provided for blue, green and red light respectively. Three sets of a liquid crystal panel 32B, 32G, 32R and a λ/4 retarder 31B, 31G, 31R are provided, one set disposed in the optical path between the wavelength separator 34 and the "blue" reflector 2B, one in the path between the wavelength separator and the "green" reflector 2G, and one in the path between the wavelength separator and the "red" reflector 2R. Each of the liquid crystal panel and λ/4 retarder combinations can be optimised for the central wavelength of each primary colour.

Figure 8:
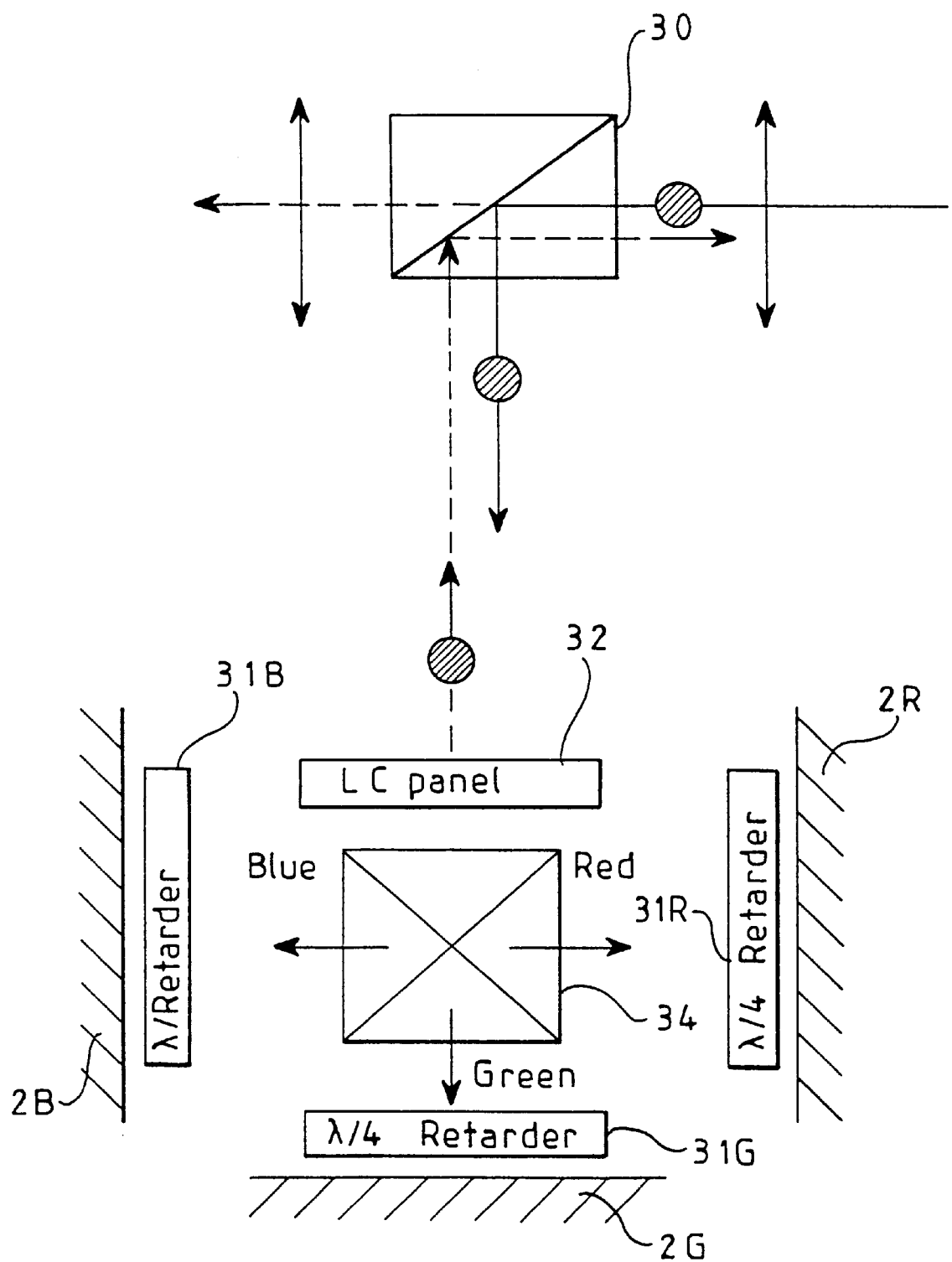
FIG. 8 is a diagrammatic view of a display according to a fifth embodiment of the invention.

FIG. 8 shows a modification of the embodiment of FIG. 7, in which the three liquid crystal panels of FIG. 7 are replaced by a single liquid crystal panel placed in the optical path between the polarising beam splitter and the wavelength separator 34. The three λ/4 retarders are optimised for blue, green and red light, respectively. A full colour display is provided by using a colour pixelated liquid crystal panel, or by a time-multiplex method. Preferably, the liquid crystal panel is an out-of-plane switching nematic liquid crystal panel, as this would enable the retardation of the liquid crystal panel to be optimised for the required colour.

Figure 9:
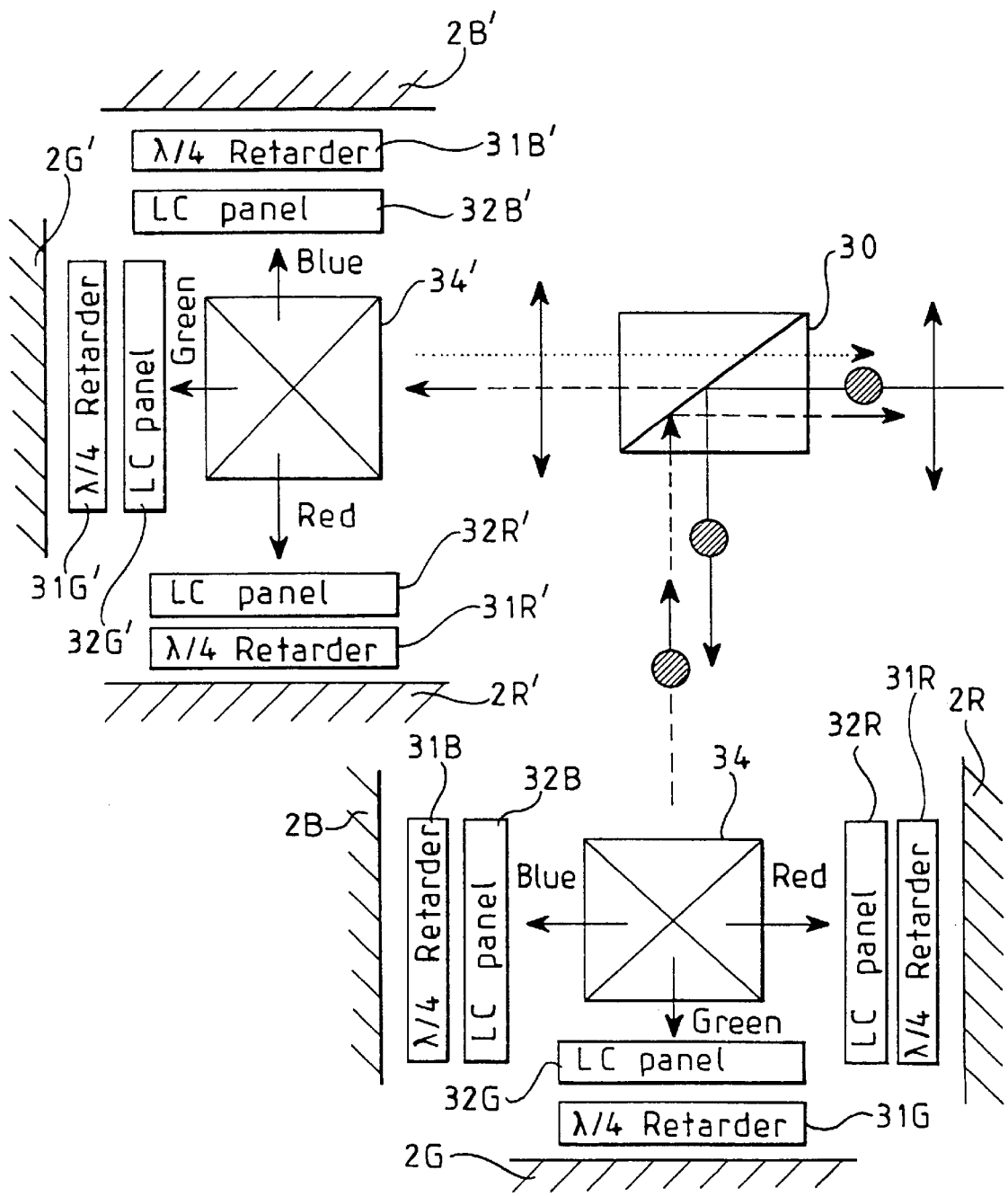
FIG. 9 is a diagrammatic view of a display according to a sixth embodiment of the invention.

FIG. 9 shows a further embodiment of the invention, in which the liquid crystal panel and λ/4 retarder combinations of the device of FIG. 6 are each replaced by a three panel system as shown in FIG. 7.

Figure 10:
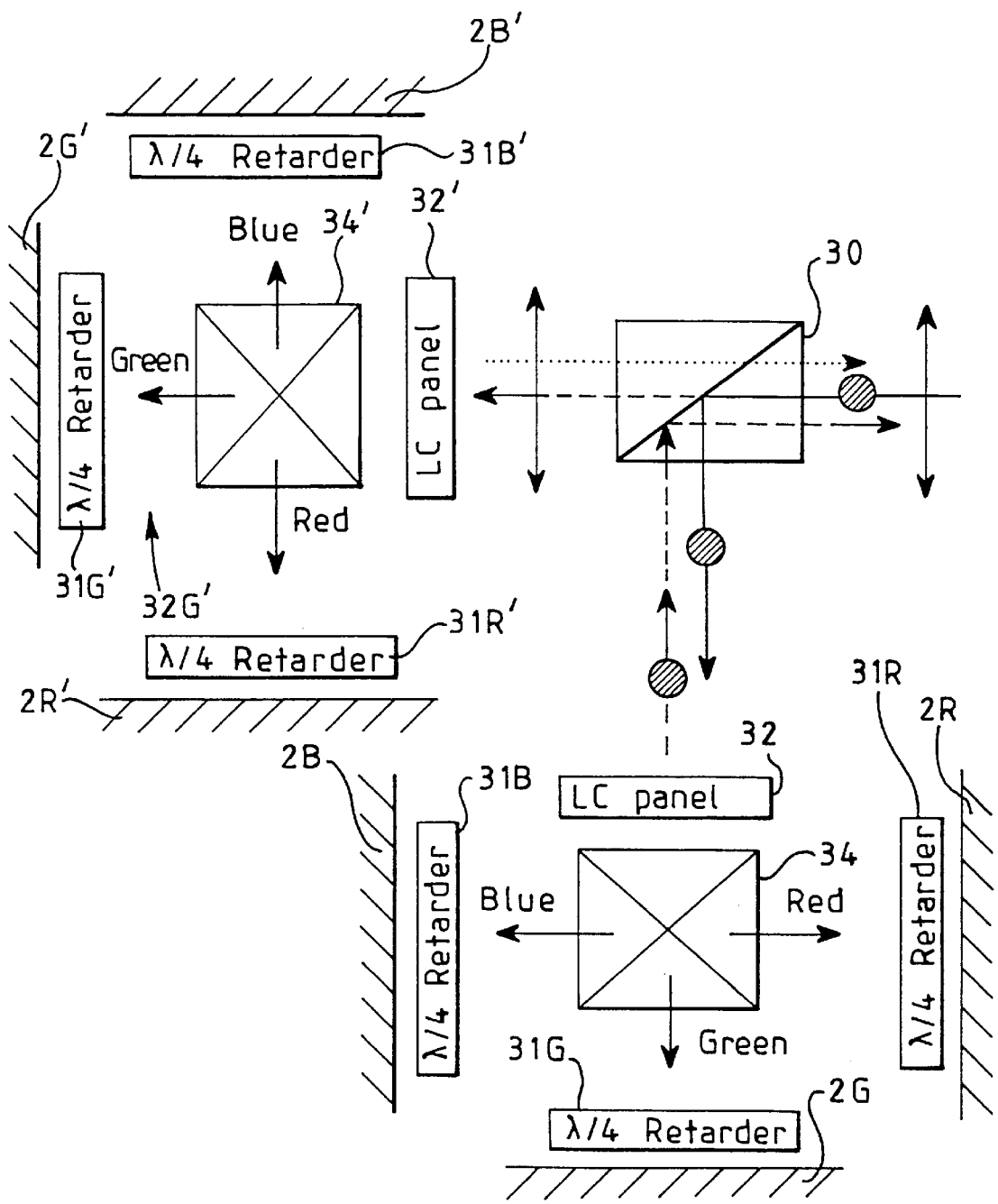
FIG. 10 is a diagrammatic view of a display according to a seventh embodiment of the invention.

In a further embodiment of the invention shown in FIG. 10, the liquid crystal panel and λ/4 retarder combinations of the device of FIG. 6 are each replaced by a three panel system as shown in FIG. 8.

The embodiments of FIGS. 9 and 10 combine the advantages of the embodiment of FIG. 6 with the embodiment of FIGS. 7 and 8. The provision of two liquid crystal panels (FIG. 10) or of two sets of liquid crystal panels (FIG. 9) allows a 3-D projection system to be provided, as set out above with reference to FIG. 6. Alternatively, the system can be arranged to divide the grey level load between the two panels (or between the two sets of panels). If the two panels (or the two sets of panels) display the same information, then the brightness of the display is increased.

The use of separate retarders for each primary colour allows the retardation to be optimised for the central wavelength of each primary colour.

Although the wavelength separators shown in FIGS. 7 to 10 separate light into three components, the invention is not limited to this. It would be possible, for example, for the wavelength separator to separate visible light into two components, such as a primary colour and its complementary colour. In this case, only two reflectors and two retarder arrangements would be necessary.

The fixed λ/4 retarders can be made from any suitable optically anisotropic material, such as a liquid crystal polymer or a reactive mesogen which is cross-linked to form a polymer. Any suitable conventional liquid crystal cell, such as those described in UK patent application No 9622733.5, can be used. The liquid crystal cells, when of the nematic type, may be a Fredericks cell, a HAN cell or a Pi cell.

What claimed is:

1. A reflective liquid crystal device comprising:
   a polarising beam splitter;
   a polarisation preserving reflector; and
   a retarder arrangement including at least two retarders, a first of which is disposed between the beam splitter and the reflector, and a second of which is disposed between the first retarder and the reflector, at least one of the first and second retarder including a liquid crystal layer which is switchable between a dark device state and a bright device state,
   wherein in the dark device state, the retarder arrangement rotates the plane of polarisation of plane-polarised light directed by the beam splitter towards the reflector by substantially n×180°, where n is an integer, and in the bright device state, the first retarder has a retardation of substantially λ/2 and the second retarder has a retardation of substantially λ/4, and
   further wherein in the bright device state the first retarder has its optic axis at an angle $\alpha$ to the plane of polarisation of the plane polarised light directed by the beam splitter towards the reflector, and the second retarder has its optic axis at an angle $2\alpha+45°$ to the plane of polarisation of the plane polarised light directed by the beam splitter towards the reflector, $\alpha$ being a value not equal to 0° or −22.5°.

2. A device as claimed in claim 1, wherein the retarder arrangement rotates the plane of polarisation of plane-polarised light directed by the beam splitter towards the reflector by substantially 90° in the bright device state.

3. A device as claimed in claim 1, wherein $\alpha$ is substantially equal to 22.5°.

4. A device as claimed in claim 1, wherein the first and second retarders each comprise a liquid crystal layer, and $\alpha$ is substantially equal to 15°.

5. A device as claimed in claim 1, wherein the first retarder comprises the liquid crystal layer whose optic axis rotates by an angle substantially equal to 22.5° about the normal direction of light passage during switching.

6. A device as claimed in claim 5, wherein the liquid crystal layer is a ferroelectric liquid crystal.

7. A device as claimed in claim 5, wherein the liquid crystal layer is an antiferroelectric liquid crystal.

8. A device as claimed in claim 5, wherein the liquid crystal layer is an electroclinic liquid crystal.

9. A device as claimed in claim 5, wherein the liquid crystal layer is an in-plane switching nematic liquid crystal.

10. A device as claimed in claim 1, wherein the first retarder comprises the liquid crystal layer and has a retardation which is switchable between substantially $p\lambda/2$ and substantially $(p+1)\lambda/2$, where p is an integer.

11. A device as claimed in claim 10, wherein p is equal to zero or one.

12. A reflective liquid crystal device comprising:
    a polarising beam splitter;
    a polarisation preserving reflector; and
    a retarder arrangement including at least two retarders, a first of which is disposed between the beam splitter and the reflector, and a second of which is disposed between the first retarder and the reflector, at least one of the first and second retarder including a liquid crystal layer which is switchable between a dark device state and a bright device state,
    wherein in the dark device state, the retarder arrangement rotates the plane of polarisation of plane-polarised light directed by the beam splitter towards the reflector by substantially n×180°, where n is an integer, and in the bright device state, the first retarder has a retardation of substantially λ/2 and the second retarder has a retardation of substantially λ/4,
    the first retarder comprises the liquid crystal layer and has a retardation which is switchable between substantially $p\lambda/2$ and substantially $(p+1)\lambda/2$, where p is an integer, and
    the liquid crystal layer is an out-of-plane switching nematic liquid crystal.

13. A reflective liquid crystal device comprising:
    a polarising beam splitter;
    a polarisation preserving reflector; and
    a retarder arrangement including at least two retarders, a first of which is disposed between the beam splitter and the reflector, and a second of which is disposed between the first retarder and the reflector, at least one of the first and second retarder including a liquid crystal layer which is switchable between a dark device state and a bright device state,
    wherein in the dark device state, the retarder arrangement rotates the plane of polarisation of plane-polarised light directed by the beam splitter towards the reflector by substantially n×180°, where n is an integer, and in the bright device state, the first retarder has a retardation of substantially λ/2 and the second retarder has a retardation of substantially λ/4, and
    further comprising a second polarisation preserving reflector, and another retarder arrangement comprising a third retarder disposed between the beam splitter and the second reflector and a fourth retarder disposed between the third retarder and the second reflector, at least one of the third and fourth retarders comprising another liquid crystal layer which is switchable between a dark device state and a bright device state, wherein in the dark device state, the another retarder arrangement rotates the plane of polarisation of plane-polarised light directed by the beam splitter towards the second reflector by substantially n×180°, where n is an integer.

14. A reflective liquid crystal device comprising:
    a polarising beam splitter for directing light towards a wavelength separator;
    first and second polarisation preserving reflectors, the wavelength separator directing light of a first wavelength towards the first reflector and directing light of a second wavelength different from the first wavelength towards the second reflector;
    a first retarder arrangement disposed in the optical path between the beam splitter and the first reflector; and
    a second retarder arrangement disposed in the optical path between the beam splitter and the second reflector, the first retarder arrangement is switchable between a dark state, in which the first retarder arrangement rotates the plane of polarisation of plane-polarised light of the first wavelength directed by the beam splitter towards the first reflector via the wavelength separator by substantially n×18°, where n is an integer, and a bright state, and the second retarder arrangement is switchable between a dark state, in which the second retarder arrangement rotates the plane of polarisation of plane-polarised light of the second wavelength directed by the beam splitter towards the second reflector via the wavelength separator by substantially n×180°, where n is an integer, and a bright state, wherein the first retarder arrangement includes, in the bright state, a first retarder having a retardation of substantially $\lambda/2$ disposed between the beam splitter and the first reflector and a second retarder having a retardation of substantially $\lambda/4$ disposed between the first retarder and the first reflector, and the second retarder arrangement includes, in the bright state, a third retarder having a retardation of substantially $\lambda/2$ disposed between the beam splitter and the second reflector and a fourth retarder having a retardation of substantially $\lambda/4$ disposed between the third retarder and the second reflector.

15. A device as claimed in claim 14, wherein the first retarder comprises a first liquid crystal layer, and wherein the third retarder comprises a second liquid crystal layer.

16. A device as claimed in claim 15, wherein the first liquid crystal layer is the second liquid crystal layer.

* * * * *